United States Patent
Qin et al.

(10) Patent No.: US 10,491,080 B2
(45) Date of Patent: *Nov. 26, 2019

(54) BRUSH ASSEMBLY (71) Applicant: JOHNSON ELECTRIC INTERNATIONAL AG, Murten (CH)

(72) Inventors: Rui Feng Qin, Hong Kong (CN); Ji Yu Liang, Shenzhen (CN); Kwok Kuen Tse, Hong Kong (CN); Xin Hui Guan, Shenzhen (CN); Shu Hai Yuan, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/989,931

(22) Filed: May 25, 2018

(65) Prior Publication Data
US 2018/0278129 A1    Sep. 27, 2018

Related U.S. Application Data (63) Continuation-in-part of application No. 14/577,534, filed on Dec. 19, 2014, now Pat. No. 10,008,911.

(30) Foreign Application Priority Data

Dec. 20, 2013 (CN) .......................... 2013 1 0711429

(51) Int. Cl.
| | |
|---|---|
| *H02K 11/026* | (2016.01) |
| *H02K 3/48* | (2006.01) |
| *H02K 1/12* | (2006.01) |
| *H02K 5/14* | (2006.01) |

(52) U.S. Cl.
CPC ............ *H02K 11/026* (2013.01); *H02K 1/12* (2013.01); *H02K 3/48* (2013.01); *H02K 5/145* (2013.01)

(58) Field of Classification Search
CPC ...... H02K 5/225; H02K 5/148; H02K 13/006; H02K 11/026
See application file for complete search history.

(56) References Cited

U.S. PATENT DOCUMENTS

| | | |
|---|---|---|
| 3,280,400 A | 10/1966 | Roe |
| 4,498,230 A | 2/1985 | Harris et al. |
| 5,148,072 A | 9/1992 | Shiroyama |
| 6,259,184 B1 | 7/2001 | Bender |
| 6,400,048 B1 | 6/2002 | Nishimura et al. |

(Continued)

FOREIGN PATENT DOCUMENTS

EP    0359603 A1    3/1990

*Primary Examiner* — Dang D Le
(74) *Attorney, Agent, or Firm* — Muncy, Geissler, Olds & Lowe, P.C.

(57) ABSTRACT

A brush assembly for a brush motor includes a support member, brush holders, at least four brushes respectively mounted to the brush holders, and first and second motor terminals for connecting with an external power supply. A first filter circuit is connected between the first motor terminal and corresponding first brushes. A second filter circuit is connected between the second motor terminal and corresponding second brushes. The first and second motor terminals and the first and second filter circuits are mounted in a region defined by two corresponding adjacent brushes forming an angle greater than 60 degrees but less than 180 degrees.

20 Claims, 7 Drawing Sheets

(56) References Cited

U.S. PATENT DOCUMENTS

| | | |
|---|---|---|
| 6,812,605 B2 | 11/2004 | Tyshchuk et al. |
| 7,119,473 B2 | 10/2006 | Simofi-Ilyes et al. |
| 7,239,062 B2 | 7/2007 | Vacheron et al. |
| 7,696,665 B2 | 4/2010 | Cavallo et al. |
| 8,080,916 B2 | 12/2011 | Shioda |
| 8,786,160 B2 | 7/2014 | Migliarelli |
| 10,008,911 B2 * | 6/2018 | Qin ........................ H02K 5/225 |
| 2005/0225195 A1 | 10/2005 | Simofi-Ilyes et al. |
| 2011/0006636 A1 | 1/2011 | Shin et al. |
| 2011/0169370 A1 | 7/2011 | Roos |
| 2013/0134811 A1 | 5/2013 | Nuzzo et al. |

* cited by examiner

FIG. 9

BRUSH ASSEMBLY

CROSS REFERENCE TO RELATED APPLICATIONS

This non-provisional patent application is a continuation-in-part of U.S. patent application Ser. No. 14/577,534, filed 19 Dec. 2014, which claims priority under 35 U.S.C. § 119(a) from Patent Application No. 201310711429.7 filed in The People's Republic of China on Dec. 20, 2013, the entire contents of which are hereby incorporated by reference.

FIELD OF THE INVENTION

This invention relates to electric motors having brushes and in particular, to a brush assembly of the motor.

BACKGROUND OF THE INVENTION

Brush motors include a stator, a rotor rotatably mounted to the stator and a brush assembly. The rotor includes a shaft, a commutator and a rotor core fixed to the shaft, and rotor windings wound around the rotor core and electrically connected with segments of the commutator. The brush assembly has brushes in sliding contact with the commutator to transfer electrical power there to.

When the motor operates, the rotor rotates relative to the stator so that the brushes and their power supply circuits are subject to voltage and current fluctuations as the brushes transfer from one segment of the commutator to the next, thus generating electromagnetic interference (EMI).

In order to suppress the motor EMI, filter capacitors and/or inductors are usually mounted on the brush assembly to prevent the motor from electrically interfering with objects outside the motor. However, because the motor usually has a small size, EMI generated at the brushes may be radiated to the motor terminals, known as the coupling effect, whereby EMI produced by the motor may still electrically interfere with the motor power supply circuit and objects outside the motor.

Thus there is a desire for a brush motor having improved EMI suppression.

SUMMARY OF THE INVENTION

Accordingly, in one aspect thereof, the present invention provides a brush assembly for a brush motor, comprising: a support member, brush holders disposed on the support member, at least two first brushes and at least two second brushes respectively mounted to the brush holders, a first motor terminal and a second motor terminal for connecting with an external power supply, a first filter circuit connected to the first motor terminal, a second filter circuit connected to the second motor terminal, wherein the first motor terminal, the second motor terminal, the first filter circuit and the second filter circuit are mounted in a region defined by two adjacent brushes of said brushes, and said two adjacent brushes form an angle greater than 60 degrees but less than 180 degrees. The at least two first brushes have the same polarity, the at least two second brushes have the same polarity opposite to the first brushes, and the two adjacent brushes defined the region have the same polarity Preferably, the angle is 120 degrees.

Preferably, a varistor is connected between the first motor terminal and the second motor terminal.

Preferably, a capacitor is connected between the first motor terminal and the second motor terminal.

Preferably, the first filter circuit comprises a first inductor connected in series between the first motor terminal and the first brushes, the first inductor being disposed parallel with one of the adjacent brushes and physically between the first motor terminal and said adjacent brush.

Preferably, the second filter circuit comprises a second inductor connected in series between the second motor terminal and the second brushes, the second inductor being disposed parallel with the other adjacent brush and physically between the second motor terminal and said other adjacent brush.

Preferably, the first filter circuit further comprises a first ground capacitor, connected between the first motor terminal and a first earth connection and physically disposed between the first inductor and the first motor terminal.

Preferably, the second motor terminal has a second earth connection.

According to a second aspect, the present invention provides a brush motor comprising a stator, a rotor and a brush assembly; wherein the rotor comprises a shaft, a commutator and a rotor core fixed to the shaft, and rotor windings wound around the rotor core and electrically connected to commutator segments of the commutator; and the stator comprises a housing, an end cap disposed at one end of the housing, and bearings supporting the shaft; and the brush assembly comprises; a support member, brush holders disposed on the support member, at least two first brushes and at least two second brushes respectively mounted to the brush holders, a first motor terminal and a second motor terminal for connecting with an external power supply, a first filter circuit connected to the first motor terminal, a second filter circuit connected to the second motor terminal, and wherein the first motor terminal, the second motor terminal, the first filter circuit and the second filter circuit are mounted in a region defined by two adjacent brushes of said brushes, said two adjacent brushes form an angle greater than 60 degrees but less than 180 degrees, and the brushes are positioned around the commutator. The at least two first brushes have the same polarity, the at least two second brushes have the same polarity opposite to the first brushes, and the two adjacent brushes defined the region have the same polarity.

Preferably, the second motor terminal is electrically connected to the motor housing.

Preferably, the stator has permanent magnets forming six magnetic poles, and the rotor core has nine winding slots, thus forming a six-pole/nine-slot motor.

Preferably, the brushes connected to the first motor terminal are symmetrical with respect to a straight line, and the brushes connected to the second motor terminal are symmetrical with respect to the straight line, the straight line passing through the region defined by said two adjacent brushes.

Preferably, the angle is greater than 90 degrees but less than 160 degrees. Most preferably, the angle is 120 degrees.

Preferably, a varistor is connected between the first motor terminal and the second motor terminal.

Preferably, a capacitor is connected between the first motor terminal and the second motor terminal.

Preferably, the first filter circuit comprises a first inductor connected in series between the first motor terminal and the first brushes, the first inductor being disposed parallel with one of the adjacent brushes and physically between the first motor terminal and said adjacent brush.

Preferably, the second filter circuit comprises a second inductor connected in series between the second motor terminal and the second brushes, the second inductor being disposed parallel with the other adjacent brush and physically between the second motor terminal and said other adjacent brush.

Preferably, the first filter circuit further comprises a first ground capacitor, connected between the first motor terminal and a first earth connection and physically disposed between the first inductor and the first motor terminal.

Preferably, the first earth connection is connected to the housing.

Preferably, a fuse is connected in series between the first inductor and the first brushes.

In summary, the brushes are distributed around the commutator and are symmetrical with respect to a rotary center of the commutator, which achieves a stable frictional contact between the brushes and the commutator and effectively reduces the noises and EMI during reversing the direction of the motor current. In addition, the motor terminal is positioned far away from the adjacent brushes, which can effectively reduce or eliminate the coupling effect of the brushes to the motor terminal, thus further suppressing the motor EMI and hence improving electromagnetic compatibility (EMC) of the motor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
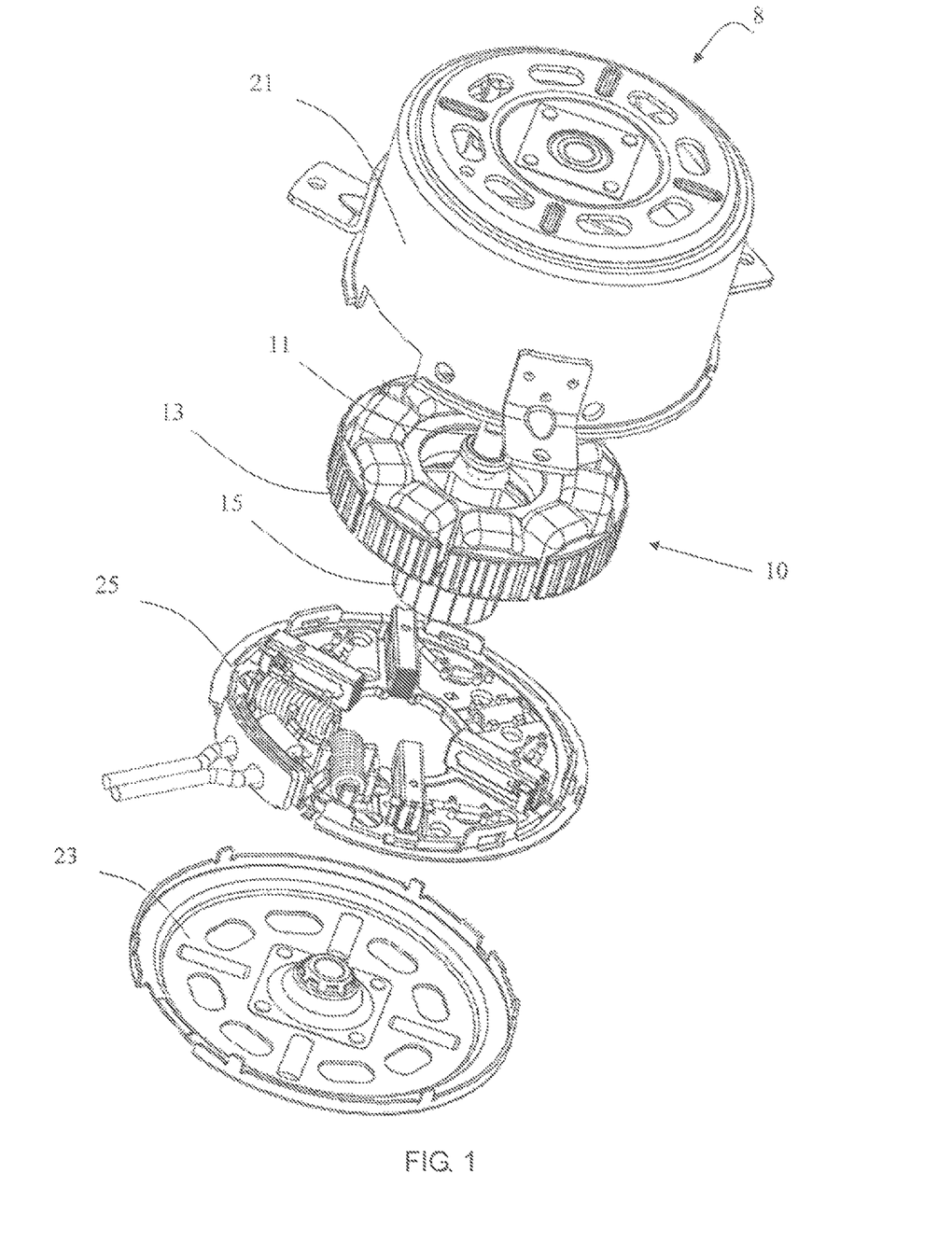
FIG. 1 is an exploded view of a direct current permanent magnet brush motor in accordance with the preferred embodiment of the present invention.
Figure 2:
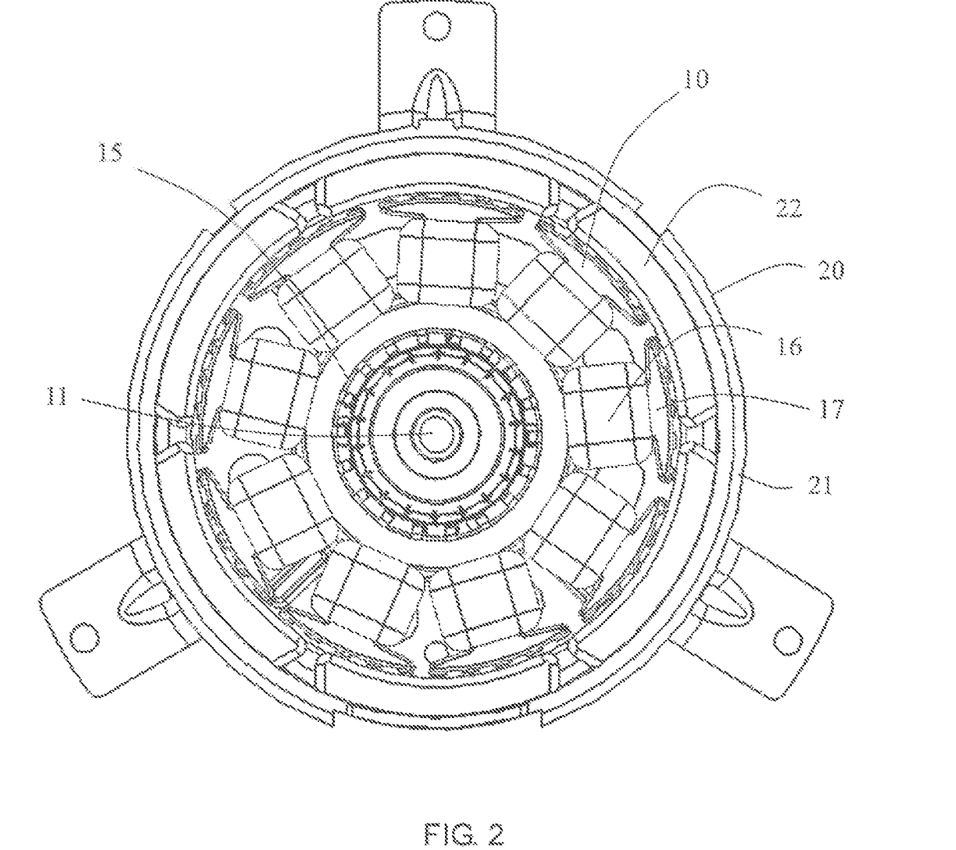
FIG. 2 is an end view of the motor of FIG. 1, with an end cap and brush card removed.

Referring to FIG. 1 and FIG. 2, a direct current permanent magnet brush motor 8 in accordance with the preferred embodiment of the present invention includes a stator 20, a rotor 10, and a brush assembly 25. The stator includes a housing 21 having a base at one end and an opening at the other end, permanent magnets 22 located inside the housing 21 and mounted to an annular sidewall of the housing 21, and an end cap 23 mounted to the open end of the housing 21. The brush assembly 25 is mounted to the open end of the housing 21 under the end cap 23. The rotor 10 includes a shaft 11, a rotor core 13 and a commutator 15 fixed to the shaft 11. Rotor windings 16 are wound around teeth 17 of the rotor core 13 and electrically connected to commutator segments of the commutator 15. Each winding 16 is wound around only one tooth 17, thus forming concentrated windings, also known as single tooth windings. One end of the shaft 11 is supported by a bearing fixed to the end cap 23, and the other end of the shaft 11 is supported by a bearing fixed to the base of the housing 21, such that the rotor can rotate relative to the stator. In this embodiment, the stator has six permanent magnets 22 forming six magnetic poles, and the rotor core has nine teeth 17 forming nine winding slots between adjacent teeth. As such, the motor is a six-pole/nine-slot motor.

Figure 3:
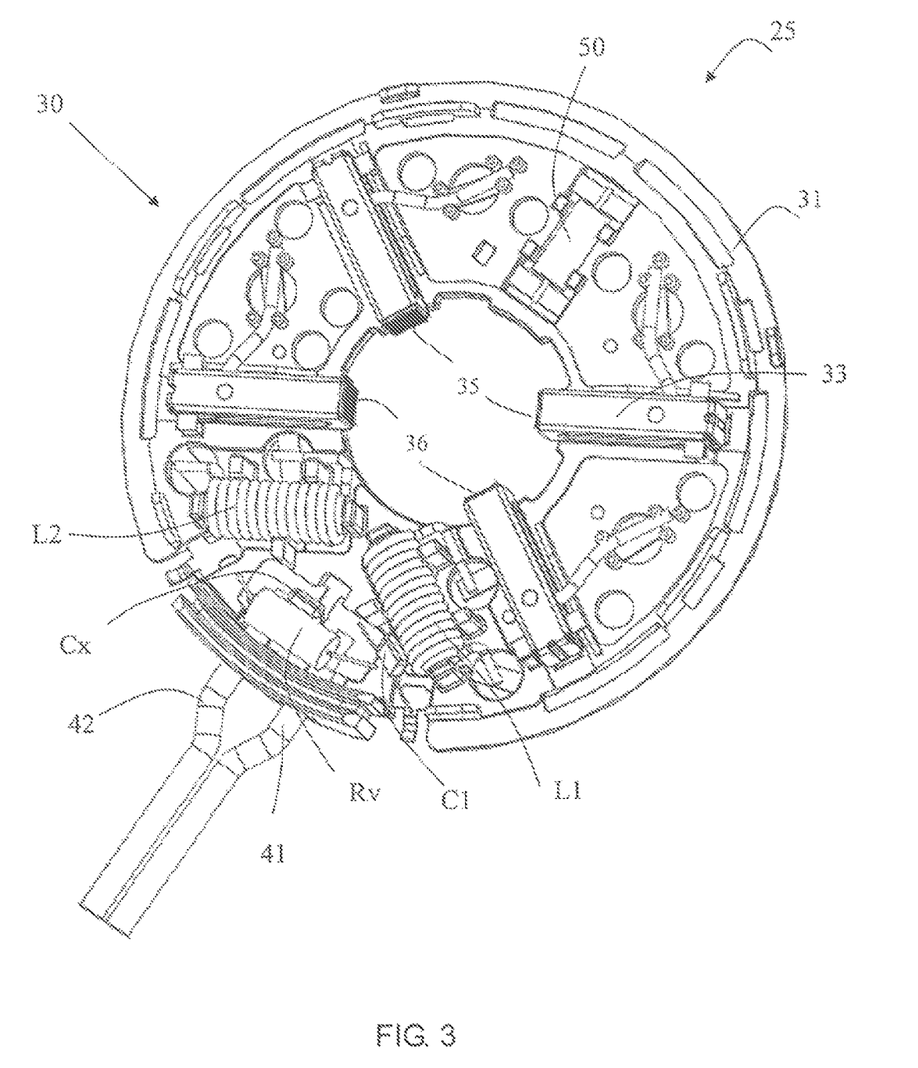
FIG. 3 illustrates the brush card of the motor of FIG. 1.
Figure 4:
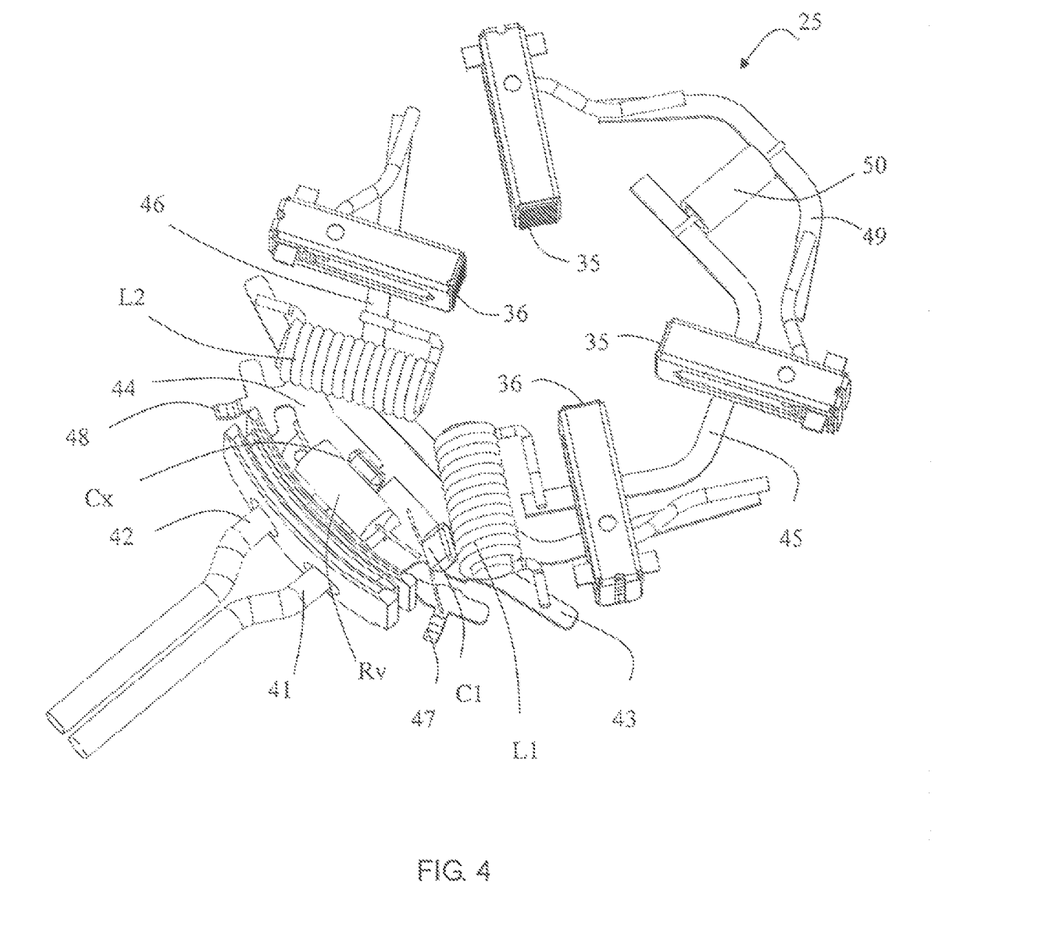
FIG. 4 illustrates components of the brush card of FIG. 3, with an insulating support member removed.

Referring to FIG. 3 and FIG. 4, in this embodiment the brush assembly 25 comprises a brush card 30 having a plate-shaped insulating support member 31, four brush holders 33 disposed on the support member 31, and four brushes 35, 36 fitted to respective brush holders 33. Brushes 35 form a first brush pair connected to the positive motor terminal and brushes 36 form a second brush pair connected to the negative motor terminal. The motor terminals comprise a first motor terminal 43 and a second motor terminal 44 for connecting with an external power supply. The first motor terminal 43 (designated as the positive terminal) is connected to the first brushes 35 (designated as the positive brushes). The second power terminal (designated as the negative terminal) is connected to the second brushes 36 (designated as the negative brushes). Lead wires 41, 42 are shown connected to the motor terminals.

When the motor 8 is assembled, the brushes are arranged around the commutator 15 and are in sliding contact with segments of the commutator 15 to form electrical connections between the motor terminals and the windings. The brushes of the first brush pair 35 are located on opposite sides of an imaginary straight line passing through a center of the commutator 15 and are symmetrical with respect to the straight line. The brushes of the second brush pair 36 are also symmetrical with respect to this straight line. In this embodiment, the four brushes are symmetrical with respect to a rotary center of the commutator 15, i.e. the positions of the four brushes after the brushes are rotated 180 degrees around the rotary center overlap with their positions prior to such rotation. For example, the positions of the first brush pair 35 after rotating 180 degrees around the center overlap with the positions of the second brush pair 36 prior to rotation, and the positions of the second brush pair 36 after rotating 180 degrees around the center overlap with the positions of the first brush pair 35 prior to rotation. Therefore, the contact between an outer peripheral surface of the commutator 15 and the brushes is more stable, which reduces the source of EMI, thus facilitating EMI suppression.

A first filter circuit connects the first motor terminal 43 to the first brush pair 35. In this embodiment, the first filter circuit includes a first inductor L1. Specifically, one end of the first inductor L1 is connected to the first motor terminal 43, and the other end of the first inductor L1 is connected to the first brushes 35 through a first conductor 45. First conductor 45 is connected to a second conductor 49 to which the two brushes 35 are connected, by a fuse 50. Fuse 50 disables the motor when excessive current is drawn by isolating the first brush pair 35.

A second filter circuit connects the second motor terminal 44 to the second brush pair 36. In this embodiment, the second filter circuit includes a second inductor L2. Specifically, one end of the second inductor L2 is connected to the second motor terminal 44, and the other end of the second inductor L2 is connected to the second brushes 36 through a third conductor 46.

In this embodiment, the first motor terminal 43 and first filter circuit, and the second motor terminal 44 and second filter circuit are all mounted in a region defined between two adjacent brushes. The two adjacent brushes 36 have the same polarity, for example, both being connected to a positive polarity or a negative polarity. The two adjacent brushes that cooperatively define the region form an angle with the rotational axis of the motor, greater than 60 degrees but less than 180 degrees, such that the first motor terminal 43 and first filter circuit, and the second motor terminal 44 and second filter circuit are mounted at positions as far away from the two adjacent brushes as possible. In some embodiments, the angle between the two adjacent brushes that define the region may be 70, 80, 90, 100, 110, 120, 130, 140, 150, 160, and 170 degrees. Preferably, the angle between the two adjacent brushes that define the region is greater than 90 degrees but less than 160 degrees.

In this embodiment, the stator 20 forms six magnetic poles, the first brush pair 35 has two brushes that form an angle of 120 degrees, and the second brush pair 36 has two brushes that form an angle of 120 degrees. The first motor terminal 43 and first filter circuit, and the second motor terminal 44 and second filter circuit are all mounted in the region defined between the two brushes 36 of the second brush pair.

In order to achieve a better filtering effect, the brush assembly further includes a varistor Rv and/or capacitor Cx connected between the first motor terminal 43 and the second motor terminal 44. The first filter circuit further includes a first ground capacitor C1. One pole of the first ground capacitor C1 is connected to the first motor terminal 43, and the other pole of the first ground capacitor C1 is electrically connected to the housing 21 of the motor 8 through a first earth connector 47 thus achieving a ground connection. Preferably, the first ground capacitor C1 is physically located between the inductor L1 and the first motor terminal 43. That is, main components (first inductor L1, first capacitor C1) of the first filter circuit are all mounted between the first motor terminal 43 and the adjacent brushes 36, for better suppressing EMI generated by the brushes 36 being radiated or transferred to the first motor terminal 43.

A portion of the second filter circuit that is close to the second motor terminal 44 is electrically connected to the housing 21 through a second earth connector 48, thus achieving a ground connection. The second motor terminal 44 is connected to ground directly through the housing 21 rather than through a capacitor connected to the housing 21, which reduces the ground impedance and thus reduces the cost. It should be noted, however, that the second motor terminal 44 may also be connected to the housing 21 through a ground capacitor. This is especially useful for bidirectional DC motors.

Figure 5:
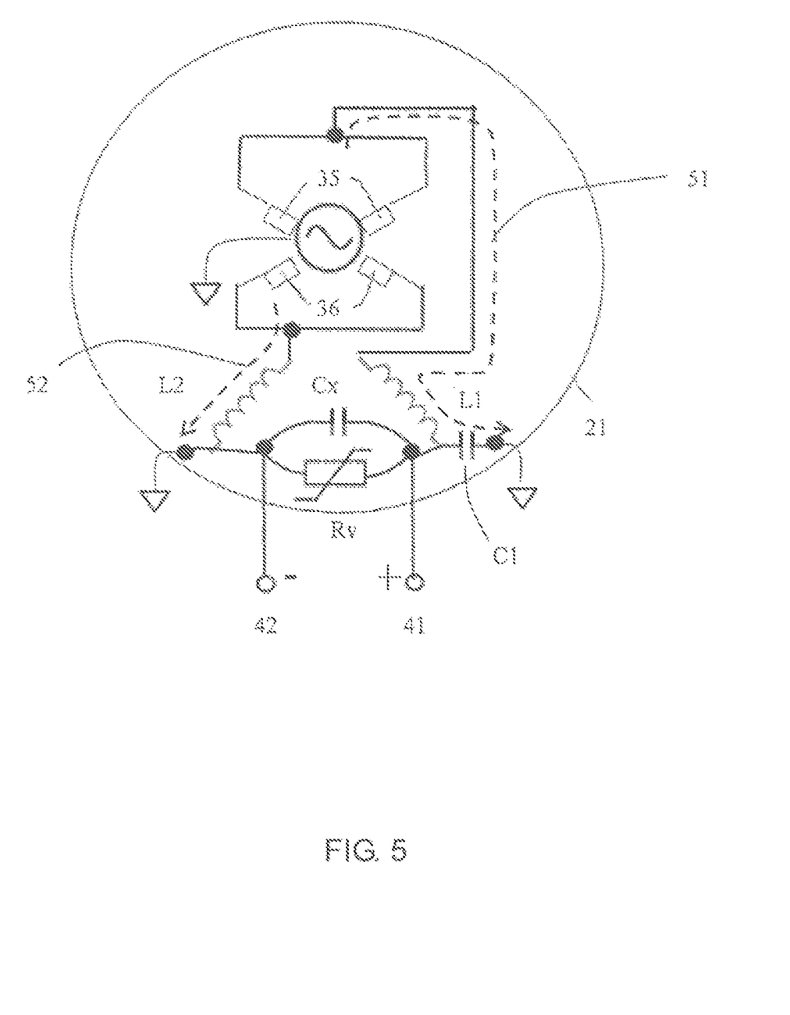
FIG. 5 is an electrical schematic diagram of the motor of FIG. 1.

Referring to FIG. 5, the voltage/current fluctuations of the first brush pair 35 is connected to ground through the housing 21 after being filtered by the first inductor L1 and the first capacitor C1, as indicated by dashed arrow 51. Thus these fluctuations do not interfere with the first motor terminal 43. The voltage/current fluctuations of the second brush pair 36 is connected to ground through the housing 21 after being filtered by the second inductor L2, as indicated by dashed arrow 52. Thus these fluctuations do not interfere with the second motor terminal 44.

In addition, the mounting position of the first filter circuit is located between the first motor terminal 43 and the first brush pair 35. That is, the first motor terminal 43 is positioned far away from the nearest brushes and is further isolated from the nearest brushes by the inductor L1, which can effectively reduce or eliminate the coupling effect of the brushes to the first motor terminal 43, thus further suppressing the motor EMI and hence improving the electromagnetic compatibility (EMC) of the motor.

Similarly, the second motor terminal 44 is positioned far away from the nearest brushes and is further isolated from the nearest brushes by the inductor L2, which can effectively reduce or eliminate the coupling effect of the brushes to the second motor terminal 44, thus further suppressing the motor EMI and hence improving the electromagnetic compatibility (EMC) of the motor.

Further, referring to FIG. 2 and FIG. 3, the first inductor L1 is parallel or substantially parallel to an adjacent brush, and the second inductor L2 is parallel or substantially parallel to another adjacent brush.

Figure 6:
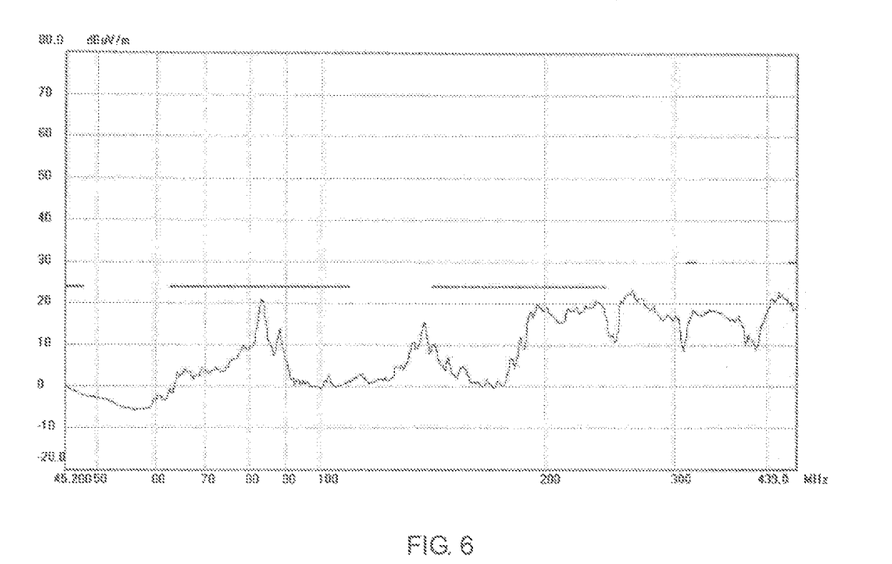
FIG. 6 and FIG. 7 are graphs showing radiated EMI test results of the motor of FIG. 1 and a conventional motor, respectively.
Figure 7:
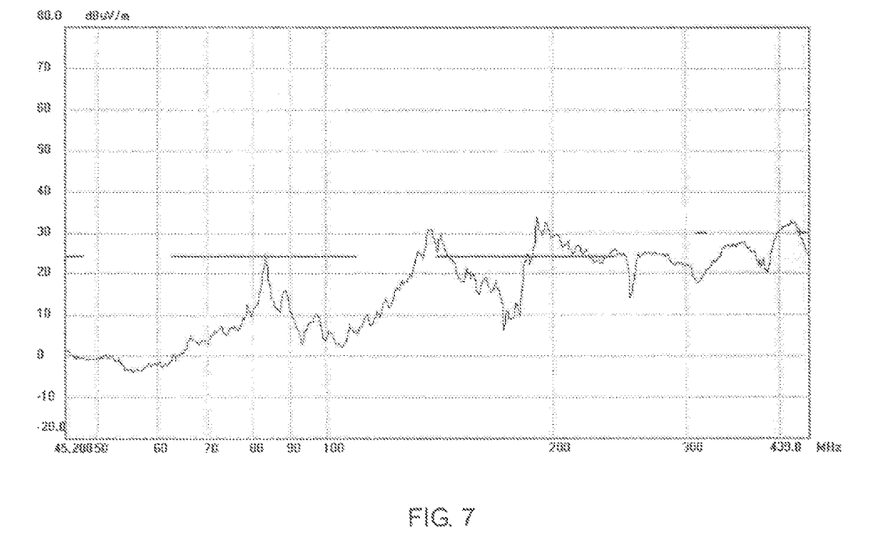

FIG. 6 and FIG. 7 are graphs showing radiated EMI test results of the motor 8 of the present invention and the conventional motor, respectively, where the unit of the horizontal axis is MHz, which represents the EMI frequency of the motor, and the unit of the vertical axis is dBuV/m, which represents the magnitude of the motor EMI. A smaller value (especially a peak value) of the vertical axis indicates a better motor EMI suppression result.

Figure 8:
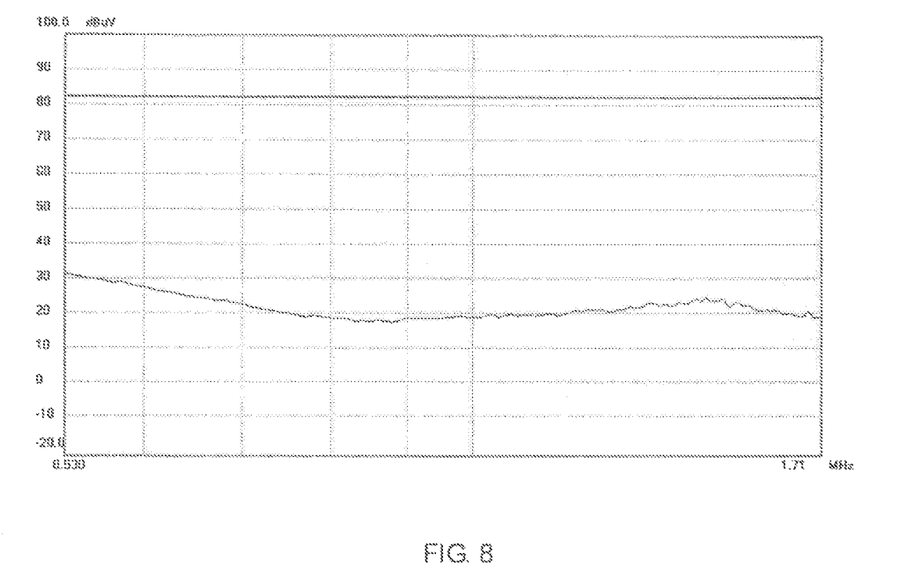
FIG. 8 and FIG. 9 are graphs showing conducted EMI test results of the motor of FIG. 1 and a conventional motor, respectively.
Figure 9:
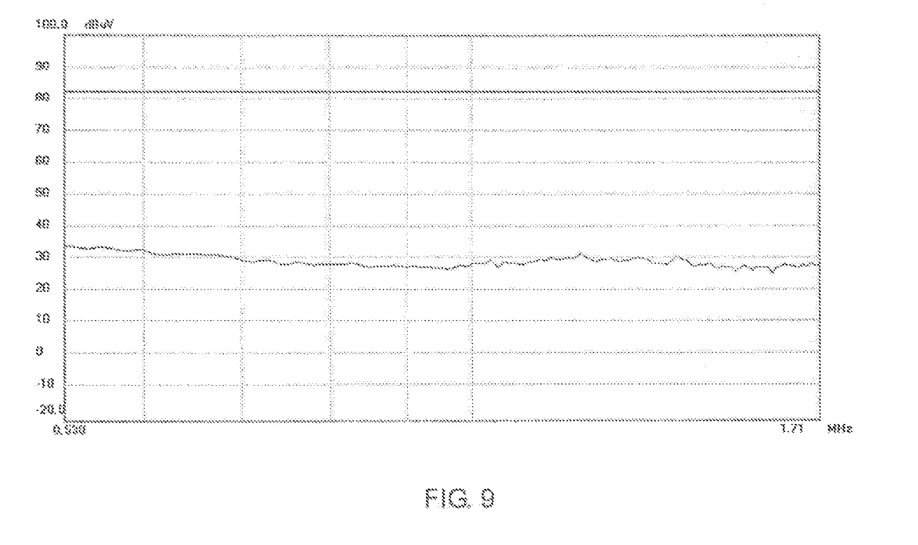

FIG. 8 and FIG. 9 are graphs showing conducted EMI test results of the motor 8 of the present invention and the conventional motor, respectively, where the unit of the horizontal axis is MHz, which represents the EMI frequency of the motor, and the unit of the vertical axis is dBuV, which represents the magnitude of the motor EMI. A smaller value of the vertical axis indicates a better motor EMI suppression result.

While the invention has been described using a 6 pole, 9 slot PMDC motor as an example, the invention is also applicable to other types of brush motors, such as universal motors and other PMDC motors with other pole/slot combinations.

In the description and claims of the present application, each of the verbs "comprise", "include", "contain" and "have", and variations thereof, are used in an inclusive sense, to specify the presence of the stated item but not to exclude the presence of additional items.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Although the invention is described with reference to one or more preferred embodiments, it should be appreciated by those skilled in the art that various modifications are possible. Therefore, the scope of the invention is to be determined by reference to the claims that follow.

The invention claimed is:
1. A brush assembly for a brush motor, comprising:
a support member,
brush holders disposed on the support member,
at least two first brushes and at least two second brushes respectively mounted to the brush holders,
a first motor terminal and a second motor terminal for two adjacent brushes connecting with an external power supply,
a first filter circuit connected to the first motor terminal,
a second filter circuit connected to the second motor terminal, wherein the first motor terminal, the second motor terminal, the first filter circuit and the second filter circuit are mounted in a region defined by two adjacent brushes of said brushes, and said two adjacent brushes form an angle greater than 60 degrees but less than 180 degrees, wherein the at least two first brushes have the same polarity, the at least two second brushes have the same polarity opposite to the first brushes, and said two adjacent brushes defined the region have the same polarity.

2. The brush assembly for the brush motor of claim 1, wherein the angle is between 90 and 160 degrees.

3. The brush assembly for the brush motor of claim 1, wherein a varistor is connected between the first motor terminal and the second motor terminal.

4. The brush assembly for the brush motor of claim 1, wherein a capacitor is connected between the first motor terminal and the second motor terminal.

5. The brush assembly for the brush motor of claim 1, wherein the first filter circuit comprises a first inductor connected in series between the first motor terminal and the first brushes, the first inductor being disposed parallel with one of the adjacent brushes and physically between the first motor terminal and said adjacent brush.

6. The brush assembly for the brush motor of claim 5, wherein the second filter circuit comprises a second inductor connected in series between the second motor terminal and the second brushes, the second inductor being disposed parallel with the other adjacent brush and physically between the second motor terminal and said other adjacent brush.

7. The brush assembly for the brush motor of claim 5, wherein the first filter circuit further comprises a first ground capacitor, connected between the first motor terminal and a first earth connection and physically disposed between the first inductor and the first motor terminal.

8. The brush assembly for the brush motor of claim 1, wherein the second motor terminal has a second earth connection.

9. A brush motor comprising a stator, a rotor and a brush assembly;
wherein the rotor comprises a shaft, a commutator and a rotor core fixed to the shaft, and rotor windings wound around the rotor core and electrically connected to commutator segments of the commutator; and
the stator comprises a housing, an end cap disposed at one end of the housing, and bearings supporting the shaft; and
the brush assembly comprises:
a support member,
brush holders disposed on the support member,
at least two first brushes and at least two second brushes respectively mounted to the brush holders,
a first motor terminal and a second motor terminal for connecting with an external power supply,
a first filter circuit connected to the first motor terminal,
a second filter circuit connected to the second motor terminal, and
wherein the first motor terminal, the second motor terminal, the first filter circuit and the second filter circuit are mounted in a region defined by two adjacent brushes of said brushes, said two adjacent brushes form an angle greater than 60 degrees but less than 180 degrees, and the brushes are positioned around the commutator,
the at least two first brushes have the same polarity, the at least two second brushes have the same polarity opposite to the first brushes, and said two adjacent brushes defined the region have the same polarity.

10. The brush motor of claim 9, wherein the second motor terminal is electrically connected to the motor housing.

11. The brush motor of claim 9, wherein the stator has permanent magnets forming six magnetic poles, and the rotor core has nine winding slots, thus forming a six-pole/nine-slot motor.

12. The brush motor of claim 9, wherein the brushes connected to the first motor terminal are symmetrical with respect to a straight line, and the brushes connected to the second motor terminal are symmetrical with respect to the straight line, the straight line passing through the region defined by said two adjacent brushes.

13. The brush motor of claim 9, wherein the angle is 120 degrees.

14. The brush motor of claim 9, wherein a varistor is connected between the first motor terminal and the second motor terminal.

15. The brush motor of claim 9, wherein a capacitor is connected between the first motor terminal and the second motor terminal.

16. The brush motor of claim 9, wherein the first filter circuit comprises a first inductor connected in series between the first motor terminal and the first brushes, the first inductor being disposed parallel with one of the adjacent brushes and physically between the first motor terminal and said adjacent brush.

17. The brush motor of claim 16, wherein the second filter circuit comprises a second inductor connected in series between the second motor terminal and the second brushes, the second inductor being disposed parallel with the other adjacent brush and physically between the second motor terminal and said other adjacent brush.

18. The brush motor of claim 17, wherein the first filter circuit further comprises a first ground capacitor, connected between the first motor terminal and a first earth connection and physically disposed between the first inductor and the first motor terminal.

19. The brush motor of claim 18, wherein the first earth connection is connected to the housing.

20. The brush motor of claim 16, wherein a fuse is connected in series between the first inductor and the first brushes.

* * * * *